March 28, 1967 J. N. MORRELL 3,311,121
AUTOMATIC REGRINDING VALVE SYSTEM
Original Filed June 18, 1963 2 Sheets-Sheet 1
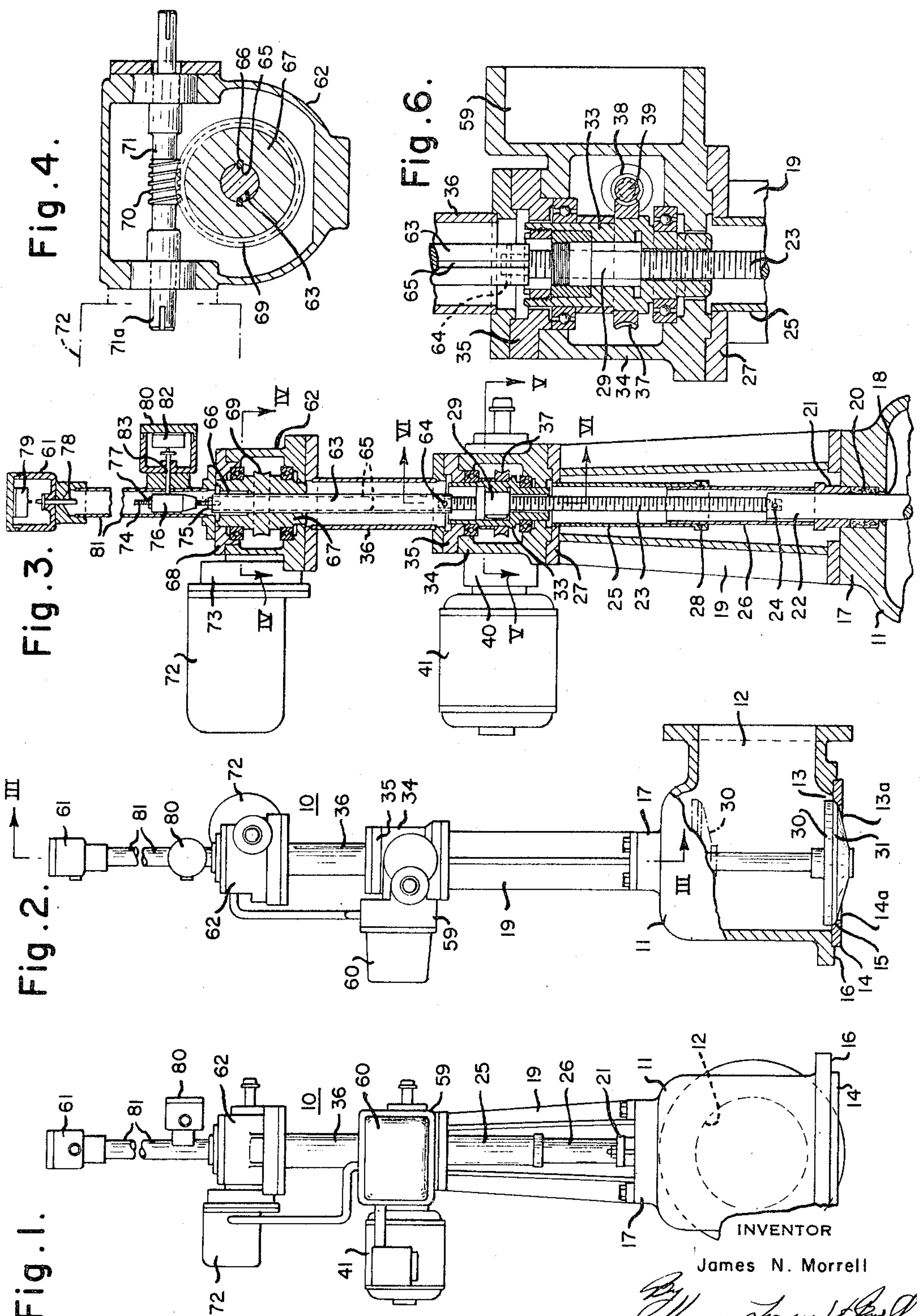
INVENTOR
James N. Morrell
By Hooper, Leonard & Buell
his attorneys INVENTOR
James N. Morrell
By Hooper, Leonard & Buell
his attorneys United States Patent Office 3,311,121

Patented Mar. 28, 1967

1

3,311,121

AUTOMATIC REGRINDING VALVE SYSTEM

James N. Morrell, Piney Point, Tex. (% E-I-M Company, Incorporated, P.O. Box 8, Pike Road, Missouri City, Tex. 77459)

Original application June 18, 1963, Ser. No. 288,679, now Patent No. 3,220,431, dated Nov. 30, 1965. Divided and this application Sept. 20, 1965, Ser. No. 488,441

6 Claims. (Cl. 137—15)

This application is a division of my copending application entitled, Automatic Regrinding Valve Apparatus, and filed June 18, 1963, Ser. No. 288,679, now Patent No. 3,220,431.

My present invention relates to apparatus and method for an automatic regrinding valve system and the like. More particularly, this invention pertains to a new combination of apparatus and steps of action by means of which so-called regrinding valves may be operated automatically from a remote or central station, or proximately as desired, with bettered control of the valve operation, longer life and more uniform action and wear.

A common prior form of so-called regrinding valve had a smooth stem which was keyed for passage through an externally threaded quill. One handle for rotation was fixed to the top of the stem and another to the top of the quill. The threads of the quill engaged a nut located at the top of a yoke so that by turning the quill handle the valve disc would move without rotation axially toward or away from its seat in accordance with the axial movement of the quill. As the valve disc was brought close to engagement with its seat, the stem handle was also rotated, sometimes by a second person, to grind the valve disc into full annular engagement with the seat as the first handle continued to be turned to rotate the quill and complete the valve closing. Both movements in the described practice were manual and gave rise to unevenness in action and wear and, further, had the disadvantage of requiring someone or more persons at the valve to operate it, which in turn limited the positions, places, conditions and times under which the valve could be utilized.

In embodiments of the instant automatic regrinding valve system, such shortcomings have been overcome with many resulting advantages. Thus, opening and closing movements of embodiments of this system are performed by drive means which are linear without rotation of the valve disc. However, as the valve disc approaches its seat in a closing direction, additional drive means are actuated to cause the disc to rotate or spin until seating and complete closure are accomplished. Such rotation grinds the valve parts into contingently uniform closure contact despite any troublesome deposit on the disc or seat, or any deposit-forming nature of the fluent material with which the valve may be used. Moreover, the new combination embraces elements which provide for slowing down of such a linear closing movement upon commencement of such rotation. Seating force as such may be controlled by adjustable switch elements to make the closing force commensurate with the service in which the embodiment is used. Consequently, evenness and uniformity are obtained in a selected operation of an embodiment hereof with, if desired, remote or proximate control irrespective of the location and position in which the device may be used and whether or not the device is readily accessible.

These and other objects, features and advantages of this invention together with structural and manipulative details thereof will be elaborated upon as the following description of a presently preferred embodiment thereof and a presently preferred method of practicing the same, proceeds.

In the accompanying drawings, I have shown a presently preferred embodiment of the invention and have illustrated a presently preferred method of practicing the same, in which FIGURE 1 is a view in elevation of one embodiment of this invention in the form of an automatic right angle short stem regrinding valve;

FIGURE 2 is a view in side elevation of the embodiment shown in FIGURE 3;

FIGURE 3 is an enlarged view of the upper portion of the embodiment shown in FIGURES 1 and 2 partly in section taken along line III—III of FIGURE 2;

FIGURE 4 is a detail view further enlarged and taken along line IV—IV of FIGURE 3;

FIGURE 6 is a detail view likewise further enlarged but taken along line VI—VI of FIGURE 3.

Figure 7:
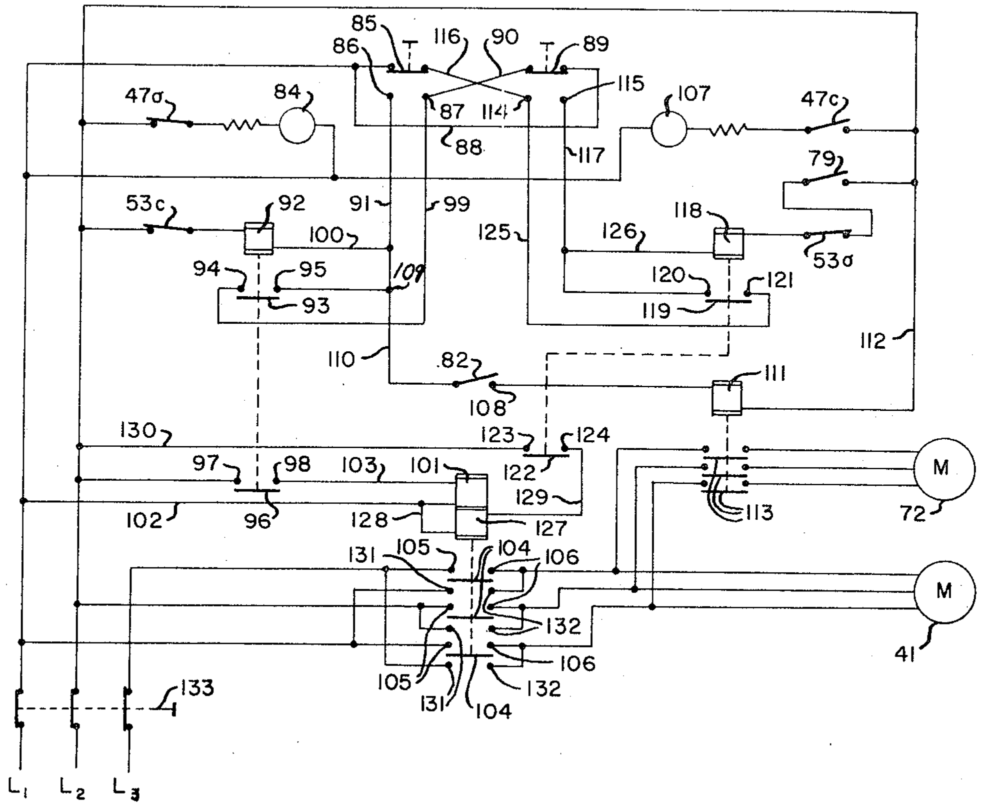
FIGURE 7 is a schematic view of one wiring circuit which can be utilized in the illustrated embodiment of this invention.

Referring to the drawings, an embodiment 10 of my automatic regrinding valve system shown therein comprises a right angle valve body 11 having openings 12 and 13, the former of which is adapted to be attached by its surrounding flange to a continuation of the opening 12. Opening 13 is provided with a replaceable circular valve seat 14 having a beveled annular seating surface 15. An annular flange 16 around the lower opening inclusive of opening 14*a* through seat 14 is adapted to be attached to a continuation of opening 13 and 13*a*. A boss 17 surrounding a valve stem opening 18 through the top of body 11, has a yoke 19 mounted thereon. The valve stem opening 18 is counterbored at 20 for a packing gland 21.

A smooth cylindrical valve stem 22 passes through opening 18 and gland 21 and is provided with an upper portion in the form of a threaded screw stem 23 preferably in the form of a frictionless ball screw. Such lower and upper portions 22–23 of the valve stem are threadably fastened together by and secured to a roll pin 24 passing transversely through both portions. Thus, the bottom of threaded portion 23 engages a small threaded axial bore in the top of portion 22, the two portions of the valve stems 22 and 23 being in coaxial alignment. A telescoping tubular protective cover has an upper part 25 fixed around its upper edge to a bottom plate 27 and a lower part 26 fixed around its bottom edge to gland 21. The parts overlap as shown in FIGURE 3, an O-ring 28 providing a seal against dust and dirt between such overlapping parts of the cover 25–26.

Valve stem 22–23 in the illustrated embodiment is a so-called rising stem which is actuated only in a linear (axial) direction by a nut 29, preferably of the ball nut (Saginaw) type matching the threads of screw 23. Assuming screw 23 has a right-hand thread. when nut 29 rotates in a clockwise direction when viewed in plan from above it, valve stem 22–23 will rise and move valve disc, 30 fastened to the bottom of portion 22, axially in an opening direction to the extent of the upward movement of stem 22–23. Conversely, when nut 29 is rotated counterclockwise, the valve disc 30 will move axially downwardly in a closing direction toward its seat 14. During either described rotation of nut 29, there is no rotation of stem 22–23, or disc 30, occasioned by such rotation of nut 29. The disc 30 is provided with a beveled annular seating surface 31 which in full seated position will be in contingent closure contact with bevel 15 of seat 14 around the entire seating surface annuli.

Nut 29 as illustrated is a ball nut having a transfer tube 29*a* (FIGURE 5) and a polygonal casing when viewed in plan. Such casing is held in a correspondingly

2 shaped pocket 32 (FIGURE 5) in a drive sleeve 33 so that nut 29 will rotate in the selected direction about the vertical axis of stem 22–23 in accordance with the direction of rotation of sleeve 33. As shown, sleeve 33 is mounted in thrust bearings in a housing 34 closed by an annular bottom plate 27, an annular top plate 35 on which a protective adapter spool 36 is also mounted.

Sleeve 33 is in a pressed fit, or in a hammer blow, relation with a worm wheel or gear 37 to be rotated thereby in accord with the direction of rotation of worm gear 37. A transverse shaft 39 carries worm 38 to engage gear 37 and is actuated in a selected direction of rotation by suitable driving means such as electric valve operator 40 having a reversible electric motor 41. Such valve operator may be a Type "E" valve operator manufactured by E-I-M Company, Incorporated, of Missouri City, Texas. In the valve operator shown, reversible motor 41 is operatively connected to gear 42 fixed to a stub shaft 43 journaled in bearing 44. The inner end of the stub shaft is provided with spiral threads 45 to engage a spiral gear which rotates a shaft 46 to operate one or the other of a pair of geared limit switches 47 depending upon the direction of rotation of shafts 43 and 46. The inner end of shaft 43 is axially counterbored and broached to provide axially extending ribs to extend between slidable splines 48 on the adjoining end of shaft 39.

The other end of shaft 39 is mounted in a thrust bearing 49 which permits rotation of shaft 39 and causes any axial movement thereof to correspondingly axially move a cam 50 having respective longitudinally extending cam grooves 51 therein. A slideway 52 in housing 34 and a captive key **52*a* extending into the cam 50 and slideway 52 holds cam 50 against rotation about its axis coincident with the axis of shaft 39. The outer end of cam 50 is fixed to a rod 54. A spring 56 is held in predetermined compression between an annular retainer 55 at the outer end of rod 54 (which retainer is free to slide inwardly relative to said rod) and a removable ring 34*a* secured in housing 34 at the inner end of subhousing 58. The retainer 55 is held against an annular shoulder 57 in housing 58. Thus when the resistance to rotational movement of worm gear 37 in either direction reaches a certain predetermined force, further rotation of shaft 39 will move it axially and respectively in one direction or the other, away from gear 37, correspondingly moving cam 50 and the grooves 51 to actuate one or the other of the torque switch guide fingers 53*a*, as the case may be. There are a pair of fingers 53*a* in side-by-side arrangement to actuate the corresponding one of the pair of switches in torque switch 53**.

Figure 5:
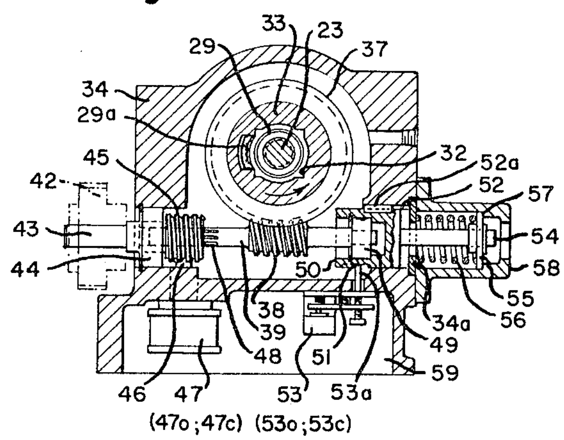
FIGURE 5 is a detail view likewise further enlarged but taken along line V—V of FIGURE 3 showing geared limit and torque switch elements utilized in the illustrated embodiment.

Thus, movement of worm 38 and shaft 39 toward the left as viewed in FIGURE 5 is resisted by the compression of spring 56 against ring **34*a* as rod 54 pulls retainer 55 inwardly a sufficient distance to move the corresponding finger 53*a*. Movement in the other direction of cam 50 and rod 54 compresses spring 56 against retainer 55 held by shoulder 57 and when that movement exceeds a predetermined distance measured by the predetermined force of such spring compression, the other of the torque switch guides will be pushed outwardly by its cam groove 51 to actuate the other of the torque limit switches in the subassembly 53. No claim is made per se to such geared limit and torque switches herein which normally are located in a switch compartment 59 provided with a removable cover 60, along with others of the circuit components illustrated in FIGURE 7. In the illustrated embodiment, the one torque limit switch 53*c* in the pair is operative at the end of the closing stroke of stem 22—23 and is used to deactuate the mechanism in a closing direction, whereas the torque switch 53*o* provided for movement in the other (opening) direction of shaft 39 is normally not operative at the extreme end of an opening stroke unless and until an upper limit switch 61** should malfunction and fail itself to terminate the actuation of the valve mechanism at the top of the opening stroke.

The flanges at the bottom and top of spool 36 are respectively connected to cover 35 and to the bottom of an upper housing 62. A guide stem 63 in coaxial relation to valve stem 22–23 is fixed by threaded engagement and a transverse pin 64 therethrough to the upper end of valve stem portion 23. Longitudinal splineways 65 are 180° apart on the exterior of the guide stem 63 for engagement by keys 66. Keys 66 project inwardly from key recesses in the wall of a central bore through a rotation sleeve 67 into the splineways 65. Hence, rotation of sleeve 67 causes guide stem 63 to rotate and to rotate the valve stem 22–23 in the same direction, while at the same time permitting longitudinal movement of all stems in the apparatus. Sleeve 67 is mounted in thrust bearings in housing 62, which is closed by an annular cover plate 68. A worm wheel 69 is secured to sleeve 62, or the helical teeth are cut in a circumferential boss on the sleeve, to be engaged by an upper worm 70 on a shaft 71 journaled at its ends in housing 62. The shaft 71, which may be provided also with a torque cut-off switch, has additional driving means therefor such as an electric motor 72 of another valve Type "E" valve operator 73. Motor 72, however, drives the motor end **71*a* of shaft 71 in the illustrated embodiment in one direction only and then only in the final approach portion of a closing stroke. Alternatively the additional driving means can take the form of a known clutched connection (not shown) or the like to the main valve driving means 40–41 for intermittent operation of the shaft 71** as in the aforementioned final approach of a closing stroke.

An actuator stud 74 is mounted in coaxial position on top of guide stem 63 and locked thereto at a selected height by a nut 75. A cylindrical cam 76 is positioned on stud 74 at a selected height and locked thereon by a nut 77. The top of stud 74 is adapted to engage a depending leg 78 of a top limit switch 61 which has a snap action microwitch 79 therein responsive to the lifting of leg 78 at the extreme upper end of an opening stroke of valve 30 in the position shown in dotted outline in FIGURE 2. A sweep limit switch 80 is provided on the side of a protector tube 81 surrounding stud 74 and cam 76. Tube 81 holds limit switch 61 mounted on top thereof. The bottom of tube 81 is fixed to cover 68. Limit switch 80 controls the rotation of valve 30 and is actuated when the microswitch 82 therein is actuated by the radial movement outwardly of its leg 83 by movement of cam 76 into position opposite thereto when valve 30 is in the final phase of a closing stroke. Valve 30 is rotated by energization of the aforesaid additional driving means such as the motor 72 whose rotational output operates through the mechanical interconnections provided in the illustrated embodiment to rotate sleeve 67 and thereby to rotate all of the stem components comprising members 63, 23 and 22 to the bottom of which valve disc 30 is rigidly affixed.

Assuming screw 23 has a right hand thread and valve 30 is closing by virtue of a counterclockwise rotation of nut 29 in plan, this embodiment also provides for the rotation of sleeve 67 when disc 30 is a predetermined distance above its seat 14 and approaching the same. Such rotation of sleeve 67 also in this example will be in a counterclockwise direction and at a rotational speed less than that of nut 29. Consequently, the instant sleeve 67 begins so to rotate, the downward movement per unit of time of valve disc 30 toward seat 14 correspondingly slows down because of the differential rotational effects of nut 29 and sleeve 67, which differential effect can be predetermined and selected to give in this example a slower speed of the final phase of closure of valve 30 corresponding to that found most useful for the particular service in which the valve is employed. Stoppage upon the predetermined force of seating engagement between surfaces 31 and 15 is effected by the closing torque limit switch **53*c* in the pair 53, shutting off both motors 41 and 72** and stopping the entire operation until there is a further actuation in an opening direction.

The operation selected for the illustrated embodiment of this invention appears more fully in considering the wiring diagram of FIGURE 7, which is but one way of wiring the illustrated and other embodiments of this invention. Therein, the diagram is shown in a condition with the regrinding valve system at rest and valve disc in fully open position as illustrated by the dotted line in FIGURE 2. Because in the postulated condition, the valve is open, a red signal lamp 84 at the control station, whether it is proximate or remote, is energized inasmuch as its geared limit switch **47*o*, one of the pair in switch means 47, has been closed causing current to flow through red lamp 84 by virtue of its connection across the power lines $L_1$ and $L_2$. Such signal lights are purely optional. If valve 30 is to be closed, or moved toward closed position, push button 85 is depressed at the control station, whether proximate or remote, and makes contact by bridging the normally open contact points 86 and 87. Thereupon, current flows in conductor $L_1$ through conductor 88, "open" push button 89 and connector 90 to a conductor 91 inasmuch as the movable contact of push button 85 is bridging the gap between terminals 86 and 87. Such flow in conductor 91 energizes solenoid 92, the other end of which is connected through closed closing torque limit switch 53*c*, one of the pair in torque switch subassembly 53**, to complete the circuit to power line $L_2$.

The energization of coil 92 brings a contact bar 93 up to bridge contact terminals 94 and 95 and a further contact bar 96 up to bridge contacts 97 and 98. Hence, even if push button 85 is immediately released, solenoid 92 remains energized as a holding circuit by virtue of the flow of current from $L_1$ through conductors 88, 90, 99, contact bar 93, conductor 100, coil 92 and closed switch **53*c* to $L_2$. At the same time, the bridging of terminals 97 and 98 by bar 96 energizes a closing stroke starter coil 101 through conductors 102 and 103 for the energization of reversible motor 41 in a closing stroke direction. This is accomplished because the energization of coil 101 lifts the gang connected contact bars 104 into gap bridging relation with the upper sets of gang terminals 105 and 106**.

Further, upon the start of such a closing stroke, the turning of shaft 46 opens switch **47*o* and turns lamp 84 off. At the same time, it closes the other geared limit switch 47*c* at the start of such a closing stroke and turns a green light 107** on to indicate that a closing stroke is in progress, or that the valve may be closed, as the case may be.

As stud 74, guide stem 63 and valve stem 23–22 continue their downward closing stroke movement without rotation, leg 83 is encountered by cam 76 when disc 30 is a predetermined close distance from but above seat 14. Thereupon microswitch 82 is closed and makes contact with its fixed terminal 108 causing current to flow from junction 109 through conductor 110 and a motor starter coil 111 for motor 72, the conductor 112 completing the circuit to $L_2$. Energization of coil 111 raises the dropped-out triple contactor bars 113 into contact with their respective terminals causing motor 72 to rotate in its predetermined direction, thereby rotating sleeve 67 and the stems 63, 23–22 and disc 30 for the regrinding rotational action whereby the spinning of the valve disc 30 cleans the valve seating surfaces 15, 31 of any accumulation or unevenness and clears the way for uniform seating engagement between these surfaces.

Such rotation caused by motor 72 also, as described above, slows down the axial travel of valve disc 30 toward seat 14 to a preselected extent, depending inversely upon the rotational speed of the valve disc 30, as deemed necessary or desirable to obtain the regrinding effect desired. When the seating force reaches the predetermined torque limit it causes shaft 39 to move axially in the corresponding direction a sufficient distance, to lift the appropriate torque leg guide **53*a* whereupon torque switch 53*c* is opened. Such opening of switch 53*c* deenergizes coil 92 and drops out contact bars 93 and 96 breaking the circuits therethrough, the latter drop-out breaking the circuit through closing starter coil 101 so that the bars 104 return to the position shown in FIGURE 7 and the whole operation stops with the valve fully closed. Such stoppage also drops out the bars 113 because coil 111 no longer receives electric current through contact bar 93**.

In an opening operation of the illustrated embodiment from a fully closed position, "open" button 89 is depressed and makes contact with terminals 114 and 115. Current then flows from $L_1$ through the contact bar of the undepressed "close" push button 85, a connector 116, conductors 117 and 126, opening stroke holding solenoid 118, closed torque switch **53*o* and closed upper limit switch 79. Switch 79 had been enclosed by the dropping of leg 78 as stud 74 moved away therefrom during the previous closing stroke. In this way, solenoid 118 is energized and completes a holding circuit by raising contact bar 119 into contact with terminals 120 and 121 and a connected contact bar 122 into contact with terminals 123 and 124. Hence, even if push button 89 is released so that it returns to the position shown in FIGURE 7, current continues to flow through coil 118 from line $L_1$ through the contact bar of push button 85, connector 116, conductor 125, contact bar 119 in contact with terminals 120–121, conductor 126, solenoid 118 and the closed switches 53*o* and 79** to power line $L_2$.

The closing of contact bar 122 in the course of such an opening stroke energizes the opening starter coil 127 for motor 41 through conductors 128, 129 and 130. Thereby, the contact bars 104 are moved into respective contact with the lower sets of terminals 131 and 132 to rotate motor 41 in the opposite, or opening stroke, direction. Such opening stroke movement, moreover, will open switch **47*c* and turn off green light 107 and will close switch 47*o* and turn on red light 84. The motor 72 will not operate during the opening stroke because the contact bars 113 remain dropped out and contact bar 93 remains out of engagement with the contact terminals 94 and 95 even though during the initial portion of the opening stroke of disc 30, limit switch 82 may be closed because cam 76 is opposite thereto. Thus, in the course of a full opening stroke, or any part thereof, there will be in the illustrated embodiment no rotation of valve disc 30 and only valve operator 40 will be energized to rotate nut 29 causing stud 74, guide stem 73 and valve stem 22–23 to rise without rotation. Such will continue automatically until leg 78 is lifted by the top of stud 74, opening switch 79 to deenergize solenoid 118 and break the contacts of contact bars 119 and 122, the latter drop-out further causing the deenergization of coil 127 so that the bars 104 return to the inoperative position shown in FIGURE 7. If in the course of a closing stroke, or of an opening stroke, before the respective extreme position is reached by disc 30, it is desired to stop the mechanism, a stop switch 133** may be pushed breaking the circuits in each of the polyphase power lines and bringing the mechanism as a whole to rest until the next actuation in the direction selected.

From the foregoing, it will be apparent that novel and efficient forms of an automatic regrinding valve system have been disclosed herein. While I have shown and described a presently preferred embodiment of the invention and have illustrated a presently preferred method of practicing the same, it is to be distinctly understood that the invention is not limited thereto but may be otherwise variously embodied and practiced within the scope of the following claims.

I claim:

1. In an automatic regrinding valve system and the like, the steps comprising, in combination, axially moving without rotation a valve stem and disc for a regrinding valve and the like in a closing stroke toward closing engagement with its valve seat, causing said axial movement by translating rotational movement into linear movement in a predetermined closing direction, rotating said valve stem and disc without changing the direction of said translating rotational movement when said valve disc is within a predetermined distance of said seat in said closing stroke, selecting the respective directions and speed of said translating rotational movement and of the rotation of said valve stem respectively to provide a predetermined slowdown in the axial approach movement of said valve disc toward said seat in a closing stroke when said valve stem and disc are rotating, and stopping said stem rotation and axial movement at the end of said closing stroke of said valve stem and disc after a predetermined engaging force between said valve disc and said valve seat is attained.

2. In an automatic regrinding valve system and the like, the steps comprising, in combination, axially moving without rotation a valve stem and closure member for a regrinding valve and the like in a closing stroke toward closing engagement with its valve seat, causing said axial movement by translating rotational movement into linear movement in a predetermined closing direction, rotating said valve stem and member without changing the direction of said translating rotational movement when said member is within a predetermined distance of said seat in said closing stroke, and stopping said rotation and axial movement at the end of said closing stroke of said valve stem and member.

3. In an automatic regrinding valve system and the like, the steps comprising, in combination, axially moving without rotation a valve stem and closure member for a regrinding valve and the like in a closing stroke toward closing engagement with its valve seat, causing said axial movement by translating rotational movement into linear movement in a predetermined closing direction, rotating said valve stem and member without changing the direction of said translating rotational movement when said member is within a predetermined distance of said seat in said closing stroke, stopping said valve stem rotation after a predetermined rotational movement thereof, and stopping said axial movement at the end of said closing stroke after a predetermined engaging force between said valve member and said valve seat is attained.

4. In an automatic regrinding valve system and the like, the steps comprising, relatively and linearly moving a valve member and a valve seat forming part thereof toward closing engagement therebetween to define a linear closing stroke, rotating said valve member and at the same time slowing down the linear approach of said valve member and said valve seat only when said member and seat are within a predetermined distance of one another within said closing stroke stopping the rotation of said valve member after a predetermined rotational movement thereof, and terminating said closing stroke after a predetermined engaging force between said valve member and said valve seat is attained.

5. In an automatic regrinding valve system and the like, the steps comprising, relatively and linearly moving a valve member and a valve seat forming part thereof toward closing engagement therebetween to define a linear closing stroke, rotating said valve member and at the same time slowing down the linear approach of said valve member and said valve seat only when said member and seat are within a predetermined distance of one another within said closing stroke, and stopping said rotation and said linear movement at the end of said closing stroke.

6. The combination according to claim 5 characterized in that said linear closing stroke is caused by translating rotational movement into linear movement in the direction of said closing stroke and in that rotation of said valve member is in such direction relative to said translating rotational movement as to differentially slow down the linear movement of said valve member.

References Cited by the Examiner

UNITED STATES PATENTS

| | | | |
|---|---|---|---|
| 1,260,509 | 3/1918 | Burge | 137—243.6 |
| 2,238,814 | 4/1941 | Kneass | 137—243.6 |
| 3,071,149 | 1/1963 | Rhodes | 137—243.3 |
| 3,126,027 | 3/1964 | Blair | 137—243.6 |

CLARENCE R. GORDON, *Primary Examiner.*